March 24, 1970 W. B. PAYNE 3,502,418
HEAT-TREATED BERYLLIUM COPPER TIP FOR A BALL-POINT
WRITING INSTRUMENT AND THE METHOD
OF PRODUCING SAME
Filed Nov. 16, 1967 2 Sheets-Sheet 1

INVENTOR
WILLIAM B. PAYNE

BY *Newton, Hopkins
Jones & Ormsby*

ATTORNEYS

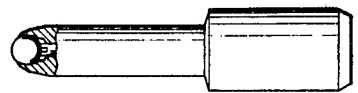
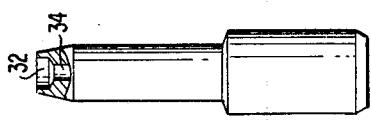
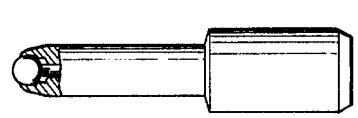
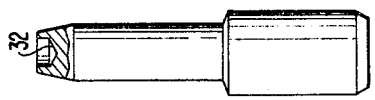
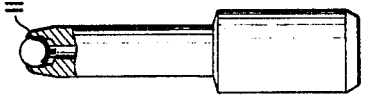
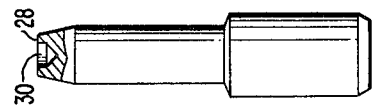
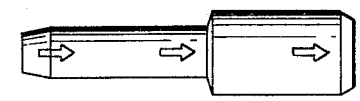
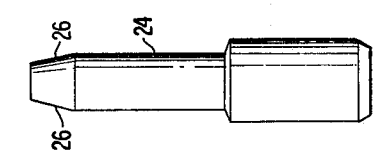
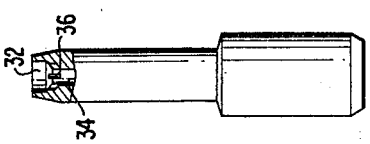
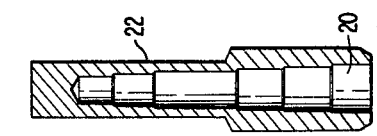
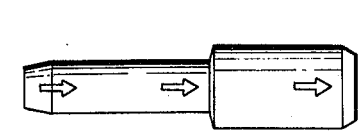

United States Patent Office 3,502,418
Patented Mar. 24, 1970

3,502,418
HEAT-TREATED BERYLLIUM COPPER TIP FOR A BALL-POINT WRITING INSTRUMENT AND THE METHOD OF PRODUCING SAME
William B. Payne, College Park, Ga., assignor to Scripto, Inc., a corporation of Georgia
Filed Nov. 16, 1967, Ser. No. 683,533
Int. Cl. B43k 7/00
U.S. Cl. 401—215          3 Claims

ABSTRACT OF THE DISCLOSURE

This invention relates to a new improved ball tip for ball-point writing instruments and a method for producing same. The ball tip of the present invention is made of a heat-treated beryllium copper and incorporates a tungsten carbide ball of a mirror finish. In addition to the conventional steps utilized in producing a ball tip for a ball pen, the method of the present invention incorporates the uniqe steps of shaping the metal around the ball by a forming tool prior to a spinning operation utilized to free the ball and then subjecting the completed ball tips to an atmospherically controlled heat treatment operation. The ball tip of the present invention renders a greatly improved wear resistant construction having an initially established controlled clearance between the ball and housing thereby rendering an initially intense ink deposit which does not increase to any extent during use due to the wear resistant properties of the housing.

BACKGROUND OF THE INVENTION

Field of invention

The present invention relates to the tip construction of ball-point writing instruments and the methods involved in the fabrication thereof. The present tip is machined from a free machine metal alloy that will increase in hardness when subjected to a heat-treating process such as the illustrative example of beryllium copper. A mirror finished tungsten carbide ball is then seated in the housing and a forming tool is then used to shape the metal around the ball to increase the lip thickness and retain the ball within the housing. The forward portion of the tip is then subjected to a spinning operation to free the ball whereupon the completed tip is subjected to a heat-treating operation in a nitrogen atmosphere for two hours at 600° F. after which the tip is cooled to room temperature in a nitrogen atmosphere. The resulting tip has great wear resistant properties and a defined controlled clearance between the ball and housing that affords an intense ink deposit that does not vary during the life of the ball pen cartridge.

Description of the prior art

The first prior art ball points used a stainless steel ball which turned inside a brass housing at the end of the ink reservoir. Stainless was used for its noncorrosive properties which were required for the corrosive composition of the inks. Brass was used because it was easy to machine in such small dimensions. It was also economical to buy.

This first materials system worked passably but had several serious deficiencies which the industry tried hard to correct. The stainless ball had several problems. First, it was extremely difficult to machine in such a small size, This added considerably to production costs. Quality control was also very difficult due to variations in production. Stainless also had a writing problem. The smoothly finished ball would pick up oil from its user's hands and this would make the ball skip over the surface of the paper and fail to write. The ball wouldn't even write on highly glossed papers such as hard finished magazine covers and programs.

The brass housing was subject mainly to wear problems. Brass is a soft material, which makes for easy machining, but since it isn't heat-treatable, it stays soft when made into a ball-point housing. The small amount of work hardening it gets isn't enough to reduce its tendency to wear during use.

Wear in a prior art ball-point takes place mainly at the end of the housing where the "lip" tapers down to a thickness of about 0.001 inch. At the usual angle for holding a pen, contact with paper is made both by the ball and the portion of the "lip" closest to the paper. This is severe abrasive wear and causes the "lip" to wear tissue-thin. When this happens, it folds over on the ball and acts as a scraper to wipe the ball clean of ink during writing. This causes blotting and renders the ball pen useless.

All during the wear process, another important change takes place. As the prior art housing starts to wear, it permits more and more ink to be deposited on the paper. Ordinarily, a 50-milligram deposit (amount of ink laid down in 1,000 feet) is considered best for visibility. As wear occurs, the deposit thickens to 80 mg. or 100 mg. or more and the line laid down becomes less attractive. The most important factor, though, is that the greater ink deposit means more rapid use of the ink supply resulting in fewer feet of writing use.

One of the first steps toward better pen performance was the introduction of the textured tungsten carbide ball. The textured surface of this ball gives it an edge over stainless steel balls because it provides traction enabling the carbide ball to roll over practically any kind of paper surface. But the carbide ball caused severe wear on the inside of the housing. In effect, it acted like a miniature grinding stone on the soft brass housing.

Some manufacturers then turned to other materials for the housings in attempts to reduce wear. Phosphor bronze, a more expensive copper-base material than brass, was used by some because it was more wear-resistant and still machinable. Others began to use larger diameter carbide balls, counting on the increased bearing surface to reduce the effects of housing wear.

Finally, the stainless steel housing was introduced. This solved the wear problem but at the expense of machinability. The type alloy used was extremely difficult to machine in such small diameters. Tool life was fantastically short for taps used to drill ink feed holes of less than 0.025 in. in diameter. Writing quality varied extensively from pen to pen. To solve this problem, manufacturers began to specify the addition of trace elements to improve its machinability. This worked, but at the expense of the material's corrosion resistance. Once again, material compromises were necessary and brought the effort short of perfection.

One of the major failures of all prior art ball point pens has been short shelf life. This is caused by the ink reacting with the tip and cartridge materials. An electrochemical reaction takes place when the ink is in contact with the different materials of the ball and the housing. The less noble material pits and causes deposits on the more noble material. Where shelf life had been long, the chances of pen failure were great.

The above manufacturing difficulties and resulting deficiencies in the commercially marketed products are overcome by the present invention.

SUMMARY OF THE INVENTION

The present invention is directed to a ball tip construction for a ball-point writing instrument that utilizes a free machining alloy that can be subsequently heat-treated to increase the hardness of the resulting completed tip. The method includes the use of a forming tool to shape the metal around the ball and increase the lip thickness and retain the ball in the housing. A subsequent spinning operation frees the ball prior to subjecting the tip to the heat-treating operation. The resulting tip has great wear resistant properties and a uniformly established clearance between the ball and housing.

The present tip construction utilizes a new grade of beryllium copper that was developed by The Beryllium Corporation, Reading, Pa., called Berylco alloy 33–25. It was basically similar to the standard beryllium copper alloy except that its machinability was vastly improved.

Several key advantages are possible with the new alloy. Easy machinability is one and this means lower production costs. Another advantage, and a key one, is that beryllium copper can be heat treated to obtain a hardness greater than stainless steel. The material is also compatible to present formulations of ink and has good corrosion resistance.

These and other features and advantages of the invention will be more clearly understood upon consideration of the following specification and accompanying drawings wherein like characters of reference designate corresponding parts throughout and in which:

BRIEF DESCRIPTION OF THE DRAWINGS

FIGURES 3a thru 3o is a flow chart setting forth the operational steps for carrying out the method of the present invention.

Figure 1:
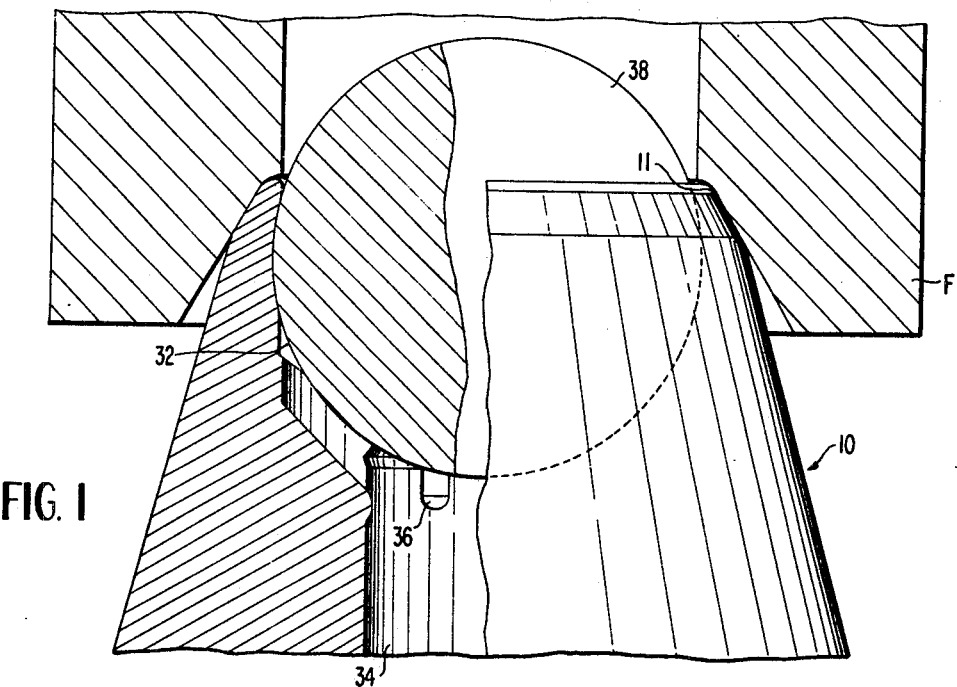
FIGURE 1 is a cross-sectional view of the ball tip of the present invention after being subjected to the shaping operation performed by the forming tool to increase the lip thickness and retain the ball within the housing and prior to the spinning operation.

These figures and the following detailed description disclose the specific embodiment of the invention, however, it is understood that the inventive concept is not limited thereto since it may be embodied in other forms.

DESCRIPTION OF ILLUSTRATIVE EMBODIMENTS

The advantages of the ball tip construction of the present invention include a freer writing point having longer wearing characteristics thereby providing a greater prolonged satisfactory life of the writing instrument as well as affording a more durable ball tip construction that is less likely to be damaged by unintentional dropping on surfaces that heretofore have indented and damaged the point configuration. In addition, the chosen material, beryllium copper, affords a hardness which provides the lip of the ball tip greater wear resistance from the abrasive surfaces with which they come in contact during normal writing.

In essence, the fabrication of the three major surfaces of the ball tip 10 of the present invention is achieved by three distinct operations. The surface 11 adjacent to the ball is fabricated by a forming operation. The next adjacent surface 12 is formed by spinning and the third surface 13 is generated by a skiving operation. The formed surface adjacent the ball provides a wear resistant and smooth configuration for contact with the writing surface.

The initial stock wire used to fabricate the tip is beryllium copper which is identified in the trade as Berylco 33–25, free machining wire, produced by The Beryllium Corporation, Reading, Pa. The beryllium copper wire is procured in diameters equal to the size of finished cartridge barrels, namely, 0.0985 in., and with specifications that call for a raw material with a tensile strength of 107,000–110,000 p.s.i. and 10% elongation. After heat treatment, tensile strength is elevated to 205,000–215,000 p.s.i. and elongation reduced to 2%.

Reference to FIGURE 3 taken in conjunction with the following description illustrates the sequence of steps in the method of manufacturing the present tip construction.

Blanks are chopped to a length of approximately .425 inch. The blanks then go through a tumbling process to remove any burrs and round the edges of the blanks. Blanks are then cleaned by a further tumbling process being submerged in trichloroethylene. After cleaning, the blanks are fed into a back drilling machine, for back drilling the blanks, which consists of seven individual drilling operations, each succeeding drilling being reduced in diameter commencing with a drill of .055 inch diameter and finishing with a drill of .036 inch diameter producing a stepper orifice 20 of .359 depth for receiving ink from the reservoir. A chamfering operation is performed on the back of each blank. The last operation performed on the back driller machine is by a rough hollow mill tool on front of blank 22 to reduce that end in diameter (see FIGURE 3a).

From the back drilling machine the blanks are cleaned by tumbling being submerged in trichloroethylene and then are fed into a point finishing machine, where the following operations are performed.

The first three steps are performed by combination tool heads containing carbide tools for bringing the front of the blank down to correct diameter 24 and skive angles 26 (see FIGURE 3b). The next facing 28 and centering 30 operations are performed by a centering tool prior to drilling the socket (see FIGURE 3c). Next, the socket 32 is rough drilled (see FIGURE 3d). Next, the blank is subjected to special combination head for drilling socket 32 to final diameter and depth (see FIGURE 3e). The socket 32 is then connected to the back orifice by drilling the capillary hole 34 (see FIGURE 3f). The point is then subjected to a finish hollow milling operation (FIGURE 3g). Next, the points are cleaned completely by flushing oil therethrough to remove all chips and foreign matter (FIGURE 3h). Next, the feed grooves 36 are formed in the seat of the socket by a loaded grooving tool (FIGURE 3i). The point is then air washed (FIGURE 3j). The ball 38 is then placed in the socket (FIGURE 3k). The ball is then seated in the socket by a loaded ball seating tool (FIGURE 3l).

Figure 2:
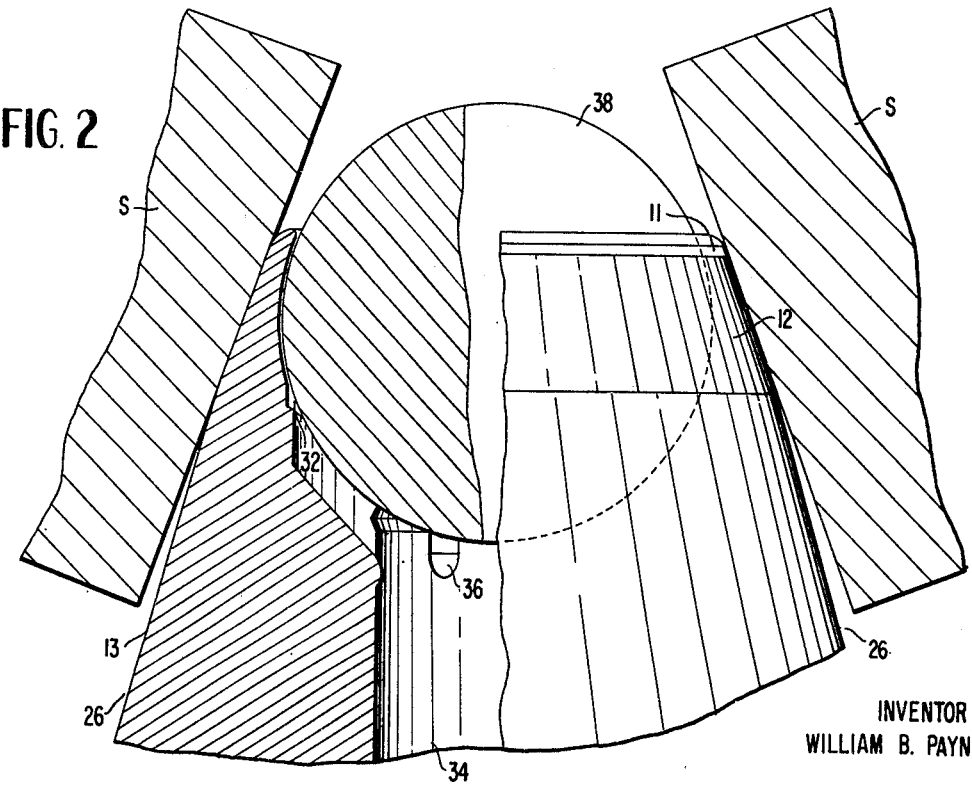
FIGURE 2 is a cross section of the completed ball tip after being subjected to a spinning operation that further shapes the lip and frees the ball.

The surface 11 adjacent the ball is formed by a prolonged forming tool F (see FIGURE 1 and FIGURE 3m). This increases the lip thickness. The ball tip is subjected to a spinning tool S (see FIGURE 2 and FIGURE 3m) to further shape the lip and free the ball, and the finished point is removed from the machine. The finished points are then run through an automatic ultrasonic cleaning process wherein the points are submerged twice in trichloroethylene and then dried through a forced air system. Once the points are completely clean and free from any foreign matter, they are run through an atmospherically controlled heat treating process. The ball tips 10 stay in a crucible furnace in a nitrogen atmosphere for two hours at 600° F. The ball tips 10 are allowed to cool in a nitrogen atmosphere to room temperature. The completed tips have a hardness factor within the range of Rockwell C35–65 and a tensile strength in excess of 200,000 p.s.i.

The nitrogen atmosphere prevents oxidation and insures uniform heating, and preserves the bright machined finish.

The present beryllium copper ball point is the only hardened housing made in the ball-point pen industry today. The hardening step complicated production somewhat because of the effects of heat-treating. One of the first problems that had to be solved was how to regulate the amount of deposit laid down by a pen after it is heat-treated. Heat-treating causes the metal to shrink slightly. The shrinkage is substantial, though, in view of the fact that the clearance between the carbide ball and the beryllium copper housing is only about 0.000003 in.—three-millionth of an inch. By the recent invention, it is possible to produce points, which after heat-treating, lay down an acceptable uniform deposit of ink, the reason being that during cool-down, the beryllium copper alloy cools faster than the tungsten carbide ball. In effect, the balls act as a shrinking mandrel and insure proper resulting clearance between the ball and housing after cooling.

The following wear test data illustrates the wear resistance of the present tip construction and the uniform clearance that is established between the ball and the housing that affords an initial intense ink deposit which does not vary appreciably during use.

TABLE OF WEAR TEST DATA

| Point material | Initial deposit, mg./1,000 feet | Final deposit, mg./1,000 feet | Increase, mg. |
|---|---|---|---|
| Brass | 44.99 | 54.29 | 9.3 |
| Stainless steel | 31.06 | 35.26 | 4.2 |
| Beryllium copper | 65.3 | 67.0 | 1.7 |

Deposits are expressed in milligrams of ink per 1,000 feet of writing. All refills were written 10,000 feet. The above results confirm that the hardness of the point material has a direct relation to wear. Brass has a Rockwell superficial hardness of less than 30 on the 30 N scale; stainless steel 52/55, and heat treated beryllium copper 59/62.

It will be obvious to those skilled in the art that many variations may be made in the embodiments chosen for the purpose of illustrating the present invention without departing from the scope thereof as defined by the appended claims.

What is claimed is:

1. A ball tip for a ball-point writing instrument comprising an integrally formed heat treated beryllium copper housing and a mirror finished tungsten carbide ball, said housing having a hardness within the range of C35–65 Rockwell.

2. A ball tip for a ball-point writing instrument as claimed in claim 1 and further characterized in that said heat treated beryllium copper has a tensile strength in excess of 200,000 p.s.i.

3. A ball tip for a ball-point writing instrument comprising an integrally formed metallic housing and a ball formed of a material different from said housing, said ball having the property of cooling slower than said housing after said housing and said ball are subjected to precipitation hardening at an elevated temperature, the tensile strength and hardness of said housing being increased by said precipitation hardening.

References Cited

UNITED STATES PATENTS 2,536,124    1/1951    Bolvin et al. _____ 401—216
3,025,835    3/1962    Race _____ 401—215

FOREIGN PATENTS 663,361    12/1951    Great Britain.
691,469    5/1953    Great Britain.

LAWRENCE CHARLES, Primary Examiner

U.S. Cl. X.R.

29—441; 401—216